(12) United States Patent
Goto et al.

(10) Patent No.: US 11,732,340 B2
(45) Date of Patent: Aug. 22, 2023

(54) HIGH-STRENGTH HOT-ROLLED COATED STEEL SHEET

(71) Applicant: JFE Steel Corporation, Tokyo (JP)

(72) Inventors: Sota Goto, Tokyo (JP); Kazuhiko Yamazaki, Tokyo (JP); Thi Huyen Doan, Tokyo (JP); Yoshihiko Ono, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/262,975

(22) PCT Filed: Jun. 10, 2019

(86) PCT No.: PCT/JP2019/022887
§ 371 (c)(1),
(2) Date: Jan. 25, 2021

(87) PCT Pub. No.: WO2020/026594
PCT Pub. Date: Feb. 6, 2020

(65) Prior Publication Data
US 2021/0238719 A1 Aug. 5, 2021

(30) Foreign Application Priority Data
Jul. 31, 2018 (JP) ................................. 2018-143804

(51) Int. Cl.
*C22C 38/60* (2006.01)
*C22C 38/38* (2006.01)
(Continued)

(52) U.S. Cl.
CPC ............ *C22C 38/60* (2013.01); *B32B 15/012* (2013.01); *B32B 15/013* (2013.01); *B32B 15/04* (2013.01); *B32B 15/043* (2013.01); *B32B 15/18* (2013.01); *C21D 6/005* (2013.01); *C21D 6/008* (2013.01); *C21D 8/0205* (2013.01); *C21D 8/0226* (2013.01); *C21D 8/0263* (2013.01); *C21D 8/0278* (2013.01); *C21D 8/0426* (2013.01); *C21D 8/0463* (2013.01); *C21D 8/0478* (2013.01); *C21D 9/46* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/28* (2013.01); *C22C 38/32* (2013.01); *C22C 38/38* (2013.01); *C22C 38/50* (2013.01); *C23C 2/06* (2013.01); *C23C 2/28* (2013.01); *C23C 2/40* (2013.01); *C23C 30/00* (2013.01);
(Continued)

(58) Field of Classification Search
CPC ..... B32B 15/013; B32B 15/012; B32B 15/04; B32B 15/043; B32B 15/18; Y10T 428/12972; Y10T 428/12799; Y10T 428/12757; Y10T 428/12958; C22C 38/60; C22C 38/001; C22C 38/002; C22C 38/005; C22C 38/02; C22C 38/04; C22C 38/06; C22C 38/08; C22C 38/12; C22C 38/14; C22C 38/16; C22C 38/22; C22C 38/28; C22C 38/32; C22C 38/38; C22C 38/00; C22C 38/50; C21D 6/005; C21D 6/008; C21D 8/0205; C21D 8/0226; C21D 8/0263; C21D 9/46; C21D 8/0426; C21D 8/0278; C21D 2211/002; C21D 2211/008; C23C 2/06; C23C 2/28; C23C 2/40; C23C 30/00; C23C 30/005
USPC ........................................................ 428/684
See application file for complete search history.

(56) References Cited

U.S. PATENT DOCUMENTS 6,364,968 B1 4/2002 Yasuhara et al.
9,903,004 B2 2/2018 Toyoda et al.
(Continued)

FOREIGN PATENT DOCUMENTS

EP 2243852 A1 10/2010
EP 2426230 A1 3/2012
(Continued)

OTHER PUBLICATIONS

Steel Dynamics "Hot-rolled Galvanized Steel Sheet" 2017 (Year: 2017).*
(Continued)

*Primary Examiner* — Michael E. La Villa
(74) *Attorney, Agent, or Firm* — RatnerPrestia

(57) ABSTRACT

Provided is a high-strength hot-rolled coated steel sheet having a TS of 980 MPa or more, excellent bulging formability and stretch flange formability, and excellent coatability.
The high-strength hot-rolled coated steel sheet includes a steel sheet having a chemical composition containing, by mass %, C: 0.03% to 0.09%, Si: 0.01% to 1.60%, Mn: 2.20% to 3.60%, P: 0.100% or less, S: 0.0100% or less, Ti: 0.05% to 0.18%, B: 0.0005% to 0.0050%, Al: 0.005% to 0.40%, N: 0.010% or less, and a balance of Fe and inevitable impurities, in which a CSM value expressed by the equation 33.8[% C][% Mn]+12.4[% Si]/[% Mn] is 3.3 to 12.0, and a steel microstructure containing bainite in an amount of 85% or more in terms of area fraction and martensite in an amount of 2.0% or more and 15.0% or less in terms of area fraction and includes a coating layer or an alloyed coating layer on a surface of the steel sheet.

4 Claims, No Drawings

(51) Int. Cl.

| | | |
|---|---|---|
| *C22C 38/32* | (2006.01) | |
| *C22C 38/28* | (2006.01) | |
| *C22C 38/22* | (2006.01) | |
| *C22C 38/16* | (2006.01) | |
| *C22C 38/14* | (2006.01) | |
| *C22C 38/12* | (2006.01) | |
| *C22C 38/08* | (2006.01) | |
| *C22C 38/06* | (2006.01) | |
| *C22C 38/04* | (2006.01) | |
| *C22C 38/02* | (2006.01) | |
| *C22C 38/00* | (2006.01) | |
| *B32B 15/01* | (2006.01) | |
| *C21D 9/46* | (2006.01) | |
| *C21D 8/02* | (2006.01) | |
| *C21D 6/00* | (2006.01) | |
| *C23C 2/06* | (2006.01) | |
| *C23C 2/28* | (2006.01) | |
| *C23C 2/40* | (2006.01) | |
| *C21D 8/04* | (2006.01) | |
| *C22C 38/50* | (2006.01) | |
| *B32B 15/04* | (2006.01) | |
| *C23C 30/00* | (2006.01) | |
| *B32B 15/18* | (2006.01) | |

(52) U.S. Cl.
CPC ...... *C23C 30/005* (2013.01); *C21D 2211/002* (2013.01); *C21D 2211/008* (2013.01); *Y10T 428/12757* (2015.01); *Y10T 428/12799* (2015.01); *Y10T 428/12958* (2015.01)

(56) References Cited

U.S. PATENT DOCUMENTS

| | | | | |
|---|---|---|---|---|
| 2008/0223491 | A1 | 9/2008 | Kimijima | |
| 2009/0238713 | A1* | 9/2009 | Kinugasa | C22C 38/14 420/104 |
| 2012/0247625 | A1* | 10/2012 | Shimamura | C22C 38/12 148/654 |
| 2013/0153096 | A1 | 6/2013 | Hamada et al. | |
| 2016/0076124 | A1* | 3/2016 | Yamazaki | C22C 38/06 148/330 |
| 2016/0289788 | A1* | 10/2016 | Shibata | C22C 38/54 |
| 2016/0319386 | A1 | 11/2016 | Hirata et al. | |
| 2017/0009316 | A1 | 1/2017 | Yamazake et al. | |
| 2017/0197235 | A1 | 7/2017 | Shuto et al. | |
| 2017/0349967 | A1* | 12/2017 | Yokoi | C22C 38/58 |
| 2018/0057905 | A1* | 3/2018 | Ota | C22C 38/001 |
| 2018/0237874 | A1* | 8/2018 | Yamazaki | C21D 8/0263 |

FOREIGN PATENT DOCUMENTS

| | | | |
|---|---|---|---|
| EP | 2559783 | A1 | 2/2013 |
| EP | 3564400 | A | 11/2019 |
| JP | 05320773 | A | 12/1993 |
| JP | 2001220647 | A | 8/2001 |
| JP | 2013076139 | A | 4/2013 |
| JP | 2013144830 | A | 7/2013 |
| WO | 2014097430 | A1 | 6/2014 |
| WO | 2015093596 | A1 | 6/2015 |
| WO | 2015129199 | A1 | 9/2015 |
| WO | 2016010004 | A1 | 1/2016 |
| WO | 2017017933 | A1 | 2/2017 |
| WO | 2018124157 | A1 | 7/2018 |

OTHER PUBLICATIONS

ASTM, Designation: E29-13, "Standard Practice for Using Significant Digits in Test Data to Determine Conformance with Specifications," 5 pages, Dec. 2014. (Year: 2014).*
International Search Report and Written Opinion for International Application No. PCT/JP2019/022887, dated Sep. 3, 2019, 5 pages.
Non Final Office Action for U.S. Appl. No. 15/747,583, dated Feb. 21, 2020, 13 pages.
Final Office Action for U.S. Appl. No. 15/747,583, dated Jul. 17, 2020, 15 pages.
Non Final Office Action for U.S. Appl. No. 15/747,583, dated Nov. 6, 2020, 15 pages.
Final Office Action for U.S. Appl. No. 15/747,583, dated Mar. 8, 2021, 18 pages.
Chinese Office Action with Search Report for Chinese Application No. 201980050486.0, dated Aug. 18, 2021, 6 pages.
Extended European Search Report for European Application No. 19 843 261.9, dated Mar. 26, 2021, 10 pages.
Xu, G., et al., "Practical Technology of Automobile Electroplating," Feb. 28, 1999, 4 pages.
Non Final Office Action for U.S. Appl. No. 15/747,583, dated Nov. 16, 2021, 20 pages.
Chinese Office Action with Search Report for Chinese Application No. 201980050486.0, dated Mar. 2, 2022, 9 pages.
Chinese Office Action for Chinese Application No. 201980050466.0, dated Jun. 6, 2022, with Concise Statement of Relevance of Office Action, 6 pages.
Korean Office Action for Korean Application No. 10-2021-7002706, dated Jul. 29, 2022 with Concise Statement of Relevance of Office Action, 4 pages.
Chinese Office Acton for Chinese Application No. 201980050486.0, dated Nov. 22, 2022 with Concise Statement of Relevance of Office Action, 5 pages.

* cited by examiner

HIGH-STRENGTH HOT-ROLLED COATED STEEL SHEET

CROSS REFERENCE TO RELATED APPLICATIONS

This is the U.S. National Phase application of PCT/JP2019/022887, filed Jun. 10, 2019, which claims priority to Japanese Patent Application No. 2018-143804, filed Jul. 31, 2018, the disclosures of these applications being incorporated herein by reference in their entireties for all purposes.

FIELD OF THE INVENTION

The present invention relates to a high-strength hot-rolled coated steel sheet which has excellent press formability, a tensile strength of 980 MPa or more, and a hole expansion ratio of 50% or more and which can preferably be used as a material for structural members of, for example, automobiles, transportation equipment, and construction equipment.

BACKGROUND OF THE INVENTION

Within the global framework for reducing $CO_2$ emissions, the automotive industry is constantly being required to reduce the weight of an automobile body without decreasing the strength of the automobile body and to thereby improve fuel efficiency. To reduce the weight of an automobile body without decreasing the strength of the automobile body, increasing the strength of a steel sheet, which is used as a material for members, and thereby reducing the thickness of the steel sheet is one of the effective methods. In particular, a steel sheet having a tensile strength of 980 MPa or more is expected to be a material which significantly improves the fuel efficiency of an automobile through weight reduction.

However, due to an increase in the strength of a steel sheet, there is generally a deterioration in bulging formability and stretch flange formability, which are particularly important when the chassis parts of an automobile are formed. Moreover, particularly in the case of, for example, chassis parts, there is an increased risk of fatigue fracture occurring when there is a decrease in the thickness of some portions of the chassis parts due to the progression of corrosion in practical use. Therefore, forming a coating layer on the surface of the steel sheet, thereby improving corrosion resistance and thereby decreasing corrosion thinning is one of the effective methods. However, in the case where there is an increase in the amounts of alloy elements, which are added to increase strength, there may be a portion in which a coating layer is not formed on the surface of the steel sheet (bare spot).

As an example of a coated steel sheet which is suitable for stretch flange forming, Patent Literature 1 discloses a high-strength steel sheet having a tensile strength of 400 MPa or more and a hot-dip Zn—Al—Mg-based coating layer, the steel sheet having a chemical composition containing, by mass %, C: 0.005% to 0.08%, Si: 0.8% or less, Mn: 0.1% to 1.8%, P: 0.05% or less, S: 0.02% or less, N: 0.001% to 0.005%, Ti: 0.02% to 0.2%, B: 0.0005% to 0.01%, Al: 0.1% or less, and a balance of Fe and inevitable impurities, in which the Ti content and the C content satisfy the relational expression Ti/C equivalent ratio=(Ti/48)/(C/12), and a microstructure including a main phase, a hard second phase in an amount of 3% or less, and cementite, in which the main phase includes a bainitic ferrite single phase or a bainitic ferrite phase and a ferrite phase, in which the proportion of low-angle boundaries with misorientations of 2° to 15° is 30% to 75%, and in which Ti-containing carbides having an average grain diameter of 20 nm or less are dispersed and precipitated.

Patent Literature 2 discloses a high-strength hot-rolled steel sheet having a characteristic value, which is expressed as a product of tensile strength (MPa) and a hole expansion ratio (%), of 35000, the steel sheet having a chemical composition containing, by mass %, C: 0.03% to 0.2%, Mn: 0.1% to 3.0%, P: 0.10% or less, S: 0.03% or less, Al+Si: 0.2% to 3.0%, N: more than 0% and 0.01% or less, O: more than 0% and 0.01% or less, and a balance of Fe and inevitable impurities, a microstructure mainly including bainite, in which the area fraction of a hard phase including martensite and/or austenite is 3% or more and less than 20%, in which the area fraction of grains having an aspect ratio of 3 or more in the hard phase existing in the central portion in the thickness direction is 60% or more, in which the lengths in the rolling direction of the grains in the hard phase existing in the central portion in the thickness direction are less than 20 µm, in which the sum of the X-ray random intensity ratios of the <011>-orientation and the <111>-orientation viewed from the rolling direction is 3.5 or more, and in which the X-ray random intensity ratio of the <001>-orientation viewed from the rolling direction is 1.0 or less.

In addition, Patent Literature 3 discloses a high-strength hot-rolled steel sheet, the steel sheet having a chemical composition containing specified amounts of C, Mn, P, S, Al, N, Ti, Cr, and B and a microstructure including a bainite phase as a main phase in an amount of 85% or more in terms of area fraction, a martensite phase or a martensite-austenite mixed phase as a second phase in an amount of 15% or less in terms of area fraction, and a balance of a ferrite phase, in which the average grain diameter of the second phase is 3.0 µm or less, in which the average aspect ratio of prior-austenite grains is 1.3 or more and 5.0 or less, and in which the area ratio of recrystallized prior-austenite grains with respect to non-recrystallized prior-austenite grains is 15% or less, a tensile strength of 980 MPa or more, which is achieved by controlling the amount of precipitates having a diameter of less than 20 nm to be 0.10% or less in terms of mass %, and excellent stretch flange formability represented by a hole expansion ratio of 60% or more.

Patent Literature 4 discloses a galvannealed steel sheet having a tensile strength of 780 MPa or more, the steel sheet having a microstructure including, by volume %, 3% or more of tempered martensite and 1% or more of retained austenite, which is formed by heating a hot-rolled steel sheet having a chemical composition containing, by mass %, C: 0.03% to 0.30%, Si: 0.005% to 2.5%, Mn: 1.9% to 3.5%, P: 0.1% or less, S: 0.01% or less, sol·Al: 0.001% to 1.5%, and N: 0.02% or less to a temperature of 720° C. or higher, by cooling the heated steel sheet to a temperature of 450° C. to 600° C. at a cooling rate of 2° C./sec to 200° C./sec, by cooling the steel sheet after a galvanizing treatment followed by an alloying treatment has been performed from an alloying treatment temperature to a temperature of 200° C. or lower at a cooling rate of 5° C./sec or more, and by performing a tempering treatment on the cooled steel sheet in a temperature range of 200° C. to 600° C. for 1 second or more and 10 minutes or less.

Patent Literature 5 discloses a hot-rolled steel sheet having a tensile strength of 900 MPa or more, the steel sheet having a chemical composition containing, by mass %, C: more than 0.050% and 0.10% or less, Si: 0.1% to 2.0%, Mn: 1.0% to 3.0%, P: 0.1% or less, S: 0.01% or less, Al: 0.005% to 0.05%, N: 0.01% or less, Ti: 0.10% to 0.20%, Nb: 0% to 0.06%, B: 0% to 0.03%, Ca: 0% to 0.005%, and a balance of Fe and inevitable impurities and a microstructure, in which an average grain diameter is 7.0 μm or less, and in which the X-ray random intensity ratio of the {211}<011>-orientation parallel to the rolling plane and parallel to the rolling direction is 2.5 or less. In Patent Literature 5, a method for manufacturing a coated steel sheet in which the hot-rolled steel sheet after coiling has been performed is heated in a reducing atmosphere to a temperature of 500° C. or higher and 650° C. or lower to activate the surface of the steel sheet and to thereby form a coating layer on the surface of the steel sheet is disclosed.

PATENT LITERATURE

PTL 1: International Publication No. WO2015/093596
PTL 2: International Publication No. WO2016/010004
PTL 3: International Publication No. WO2017/017933
PTL 4: Japanese Unexamined Patent Application Publication No. 2013-144830
PTL 5: International Publication No. WO2014/097430

SUMMARY OF THE INVENTION

However, in the case of Patent Literature 1, a tensile strength of 980 MPa or more is not achieved.

In the case of Patent Literature 2, a high strength-hole expansion ratio balance is not stably achieved. In addition, in the case of Patent Literature 2, no consideration is given to coatability.

In the case of Patent Literature 3, a hot-rolled steel sheet having a high strength of 980 MPa or more and excellent hole expansion formability is obtained. However, in the case of Patent Literature 3, sufficient consideration is not given to coatability.

In the case of Patent Literature 4, since it is necessary for a tempering treatment to be additionally performed after a galvanizing treatment has been performed on a hot-rolled steel sheet, there is an issue to be addressed from the viewpoint of economic efficiency.

In the case of Patent Literature 5, it is necessary to control a finishing delivery temperature of hot rolling to be 960° C. or higher to form the desired microstructure. However, in the case where the finishing delivery temperature is high, since scale grows excessively on the surface of the steel sheet, the scale causes biting flaws and remains on the surface after pickling has been performed, which may result in a deterioration in coatability.

As described above, in the case of the conventional techniques, a technique related to a high-strength hot-rolled steel sheet having high strength represented by a tensile strength of 980 MPa or more, excellent press formability, and excellent coatability has not yet been established.

An object according to aspects of the present invention is, by solving the problems described above, to provide a high-strength hot-rolled coated steel sheet having a tensile strength of 980 MPa or more, excellent bulging formability and stretch flange formability, and excellent coatability.

To achieve the object described above, the present inventors diligently conducted investigations for improving the bulging formability and stretch flange formability of a hot-rolled coated steel sheet while achieving a tensile strength of 980 MPa or more and, as a result, found that it is possible to achieve a high strength of 980 MPa or more, excellent bulging formability, and excellent stretch flange formability by forming a microstructure including a bainite structure as a main phase and a martensite structure as a second phase, in which the area fraction of the second phase is controlled to be 2.0% to 15.0%.

Here, the term "bainite structure" denotes a microstructure that is formed at an intermediate temperature range between a range for a polygonal ferrite structure, which is formed through diffusion transformation, and a range for a martensite structure, which is formed through diffusionless transformation, and that has an average dislocation density of $5 \times 10^{14}$ to $5 \times 10^{15}$ m$^{-2}$. A bainite structure has a lath-structured form. Therefore, it is possible to clearly distinguish a bainite structure from a polygonal ferrite structure by using, for example, a scanning electron microscope (SEM). It is also possible to distinguish a martensite structure from a bainite structure by making a detailed observation of the sub-grain structure of the martensite structure by using a SEM. In addition, it is also possible to distinguish between a martensite structure and a bainite structure by using an electron backscatter diffraction (EBSD) analyzer which is attached to a SEM. That is, such a distinction is made by utilizing the fact that, since a martensite structure has a higher dislocation density than a bainite structure, a martensite structure has a lower Image Quality (IQ value) in EBSD than that in a bainite structure. In the case where an EBSD pattern is taken under the conditions of an accelerating voltage of 15 kV and a focal length of 19 mm, the IQ value of a martensite structure is 80000 or less.

Regarding bulging formability, since a steel sheet having a high yield ratio (the ratio of yield strength to tensile strength) has low strain dispersibility, necking or fracturing tends to occur in a place in which strain is concentrated, which results in a deterioration in bulging formability. In addition, in the case where a single-phase structure and a multi-phase structure have the same strength and ductility, the single-phase structure has a higher yield ratio than the multi-phase structure. Therefore, in accordance with aspects of the present invention, to achieve sufficient bulging formability, bulging formability is improved by forming a second phase structure whose strength and ductility are different from those of a main phase in a steel sheet and thereby decreasing the yield ratio. In addition, there is an improvement in stretch flange formability in the case where the amount of a second phase, which becomes a starting point at which voids are generated during a hole expansion test, is small. In accordance with aspects of the present invention, sufficient bulging formability is achieved without causing a deterioration in stretch flange formability by controlling the area fraction of a second phase to be within an appropriate range.

Aspects of the present invention have been completed on the basis of the knowledge described above and the results of additional close investigations regarding the effects of the amounts of alloy elements added on coatability and steel microstructure, and the subject matter according to aspects of the invention is as follows.

[1] A high-strength hot-rolled coated steel sheet including a steel sheet having a chemical composition containing, by mass %, C: 0.03% to 0.09%, Si: 0.01% to 1.60%, Mn: 2.20% to 3.60%, P: 0.100% or less, S: 0.0100% or less, Ti: 0.05% to 0.18%, B: 0.0005% to 0.0050%, Al: 0.005% to 0.40%, N: 0.010% or less, and a balance of Fe and inevitable impurities, in which a CSM value expressed by equation (1) below is 3.3 to 12.0, and a steel microstructure containing bainite in an amount of 85% or more in terms of area fraction and martensite in an amount of 2.0% or more and 15.0% or less in terms of area fraction and including a coating layer or an alloyed coating layer on a surface of the steel sheet.

$$\text{CSM value} = 33.8[\% \text{ C}][\% \text{ Mn}] + 12.4[\% \text{ Si}]/[\% \text{ Mn}] \quad (1)$$

In equation (1), [% C], [% Mn], and [% Si] each denote the content (mass %) of the corresponding element.

[2] The high-strength hot-rolled coated steel sheet according to item [1], in which the chemical composition further contains, by mass %, one or both of Nb: 0.005% to 0.060% and V: 0.005% to 0.080%.

[3] The high-strength hot-rolled coated steel sheet according to item [1] or [2], in which the chemical composition further contains, by mass %, one or more of Cr: 0.02% to 0.15%, Mo: 0.02% to 0.5%, Cu: 0.05% to 0.5%, and Ni: 0.05% to 1.0%.

[4] The high-strength hot-rolled coated steel sheet according to any one of items [1] to [3], in which the chemical composition further contains, by mass %, Sb: 0.0002% to 0.0200%.

[5] The high-strength hot-rolled coated steel sheet according to any one of items [1] to [4], in which the chemical composition further contains, by mass %, one or more of Ca: 0.0002% to 0.0100%, Mg: 0.0002% to 0.0100%, and REM: 0.0002% to 0.0100%.

According to aspects of the present invention, it is possible to obtain a high-strength hot-rolled coated steel sheet having a tensile strength of 980 MPa or more and excellent press formability. In addition, since this high-strength hot-rolled coated steel sheet has excellent coatability, it is possible to manufacture this coated steel sheet with high economic efficiency, without a bare spot, and with stability.

In the case where the high-strength hot-rolled coated steel sheet according to aspects of the present invention is used for the chassis parts, structural members, and skeleton parts of an automobile and truck frames, it is possible to reduce the weight of the vehicles while the reliability of the vehicles is maintained, which has a significant effect on the industry.

In addition, in accordance with aspects of the present invention, the expression "having excellent press formability" denotes a case of bulging formability represented by a yield ratio of 0.93 or less and stretch flange formability represented by a hole expansion ratio λ of 50% or more. Here, in consideration of a balance with other properties such as tensile strength, it is preferable that the yield ratio be 0.70 or more or more preferably 0.75 or more. In addition, similarly, in consideration of a balance with other properties, it is preferable that the hole expansion ratio be 95% or less or more preferably 90% or less.

DETAILED DESCRIPTION OF EMBODIMENTS OF THE INVENTION

Hereafter, an embodiment of the present invention will be described. Here, the present invention is not limited to the embodiment below.

The high-strength hot-rolled coated steel sheet according to aspects of the present invention includes a steel sheet and a coating layer or an alloyed coating layer. First, the steel sheet will be described.

The steel sheet has the chemical composition described below. In the description below, "%", which is a unit of the content of each of the constituents of the chemical composition, denotes "mass %".

C: 0.03% to 0.09%

C is an element which improves the strength of steel, thereby improving hardenability, and thereby promoting the formation of a bainite structure and a second phase structure. In accordance with aspects of the present invention it is necessary that the C content be 0.03% or more or preferably 0.04% or more. On the other hand, in the case where the C content is more than 0.09%, since there is an excessive increase in the strength of the second phase, there is a deterioration in stretch flange formability, even in the case where the area fraction of the second phase is controlled to be 15.0% or less. Therefore, the C content is set to be 0.09% or less or more preferably 0.08% or less.

Si: 0.01% to 1.60%

Si is an element which is effective for promoting the formation of a second phase. Therefore, the Si content is set to be 0.01% or more or preferably 0.10% or more. On the other hand, in the case where the Si content in a coated steel sheet is more than 1.60%, since there is a deterioration in the adhesiveness of a coating layer, there is a deterioration in the corrosion resistance of the steel sheet. Therefore, the Si content is set to be 1.60% or less, preferably 1.20% or less, more preferably 1.00% or less, or even more preferably 0.70% or less.

Mn: 2.20% to 3.60%

Mn is an element which contributes to increasing the strength of steel by forming a solid solution and which improves hardenability and thereby promotes the formation of a bainite structure and a second phase structure. Therefore, the Mn content is set to be 2.20% or more, preferably 2.40% or more, or more preferably 2.60% or more. On the other hand, in the case where the Mn content is more than 3.60%, since there is a deterioration in the adhesiveness of a coating layer, there is a deterioration in the corrosion resistance of a steel sheet. Therefore, the Mn content is set to be 3.60% or less, preferably 3.40% or less, or more preferably 3.20% or less.

P: 0.100% or Less

P is an element which is contained as an impurity. P causes a deterioration in toughness as a result of being segregated at prior-austenite grain boundaries, thereby causing cracking to occur when slab heating or hot rolling is performed. Therefore, it is preferable that the P content be as small as possible. It is acceptable that the P content be 0.100% or less, preferably 0.050% or less, or more preferably 0.020% or less. Here, there is no problem, if the P content is zero.

S: 0.0100% or Less

S is an element which causes a deterioration in the bulging formability and stretch flange formability of a high-strength hot-rolled coated steel sheet by combining with Ti and Mn to form coarse sulfides. Therefore, it is preferable that the S content be as small as possible. It is acceptable that the S content be 0.0100% or less, preferably 0.0050% or less, or more preferably 0.0035% or less.

Ti: 0.05% to 0.18%

Ti is an element which has the function of improving the strength of a steel sheet through precipitation strengthening or solid solution strengthening. In addition, Ti has the function of fixing N by forming nitrides in a casting process. Accordingly, since the precipitation of BN is inhibited, B exists in steel in the form of a solid solution, resulting in sufficient hardenability, which is necessary for the formation of a bainite structure, being achieved. To realize such effects, it is necessary that the Ti content be 0.05% or more, preferably 0.07% or more, or more preferably 0.09% or more. On the other hand, in the case where the Ti content is more than 0.18%, since there is an increase in yield ratio due to an excessive increase in the degree of precipitation strengthening, there is a deterioration in bulging formability. Therefore, the Ti content is set to be 0.18% or less or preferably 0.16% or less.

B: 0.0005% to 0.0050%

B is an element which inhibits the formation of ferrite as a result of being segregated at prior-austenite grain boundaries, thereby promoting the formation of a bainite structure, and thereby contributing to improving the strength of a steel sheet. To realize such effects, the B content is set to be 0.0005% or more. On the other hand, in the case where the B content is more than 0.0050%, since there is an excessive improvement in hardenability, an excessive amount of martensite structure is formed, which results in a deterioration in stretch flange formability. Therefore, the B content is set to be 0.0050% or less, preferably 0.0040% or less, or more preferably 0.0030% or less.

Al: 0.005% to 0.40%

Al is an element which is effective for improving the cleanliness of steel as a result of functioning as a deoxidizing agent. To realize such an effect, it is necessary that the Al content be 0.005% or more or preferably 0.010% or more. On the other hand, in the case where the Al content is more than 0.40%, since there is an increase in the amount of Al oxide-based inclusions, there is a deterioration in stretch flange formability. Therefore, the Al content is set to be 0.40% or less, preferably 0.10% or less, or more preferably 0.06% or less.

N: 0.010% or Less

N tends to combine with Ti to form coarse nitrides at a high temperature and thereby causes a deterioration in stretch flange formability. Therefore, the N content is set to be 0.010% or less, preferably 0.008% or less, or more preferably 0.006% or less. Here, there is no problem, if the N content is zero. However, it is preferable that the N content be 0.0005% or more.

CSM Value: 3.3 to 12.0

In accordance with aspects of the present invention, to achieve sufficient bulging formability, stretch flange formability, and coatability, the contents of C, Si, and Mn are controlled so that the CSM value expressed by equation (1) below is 3.3 to 12.0. In the case where the CSM value is less than 3.3, since there is an insufficient amount of second phase structure formed, there is a deterioration in bulging formability. Therefore, the CSM value is set to be 3.3 or more, preferably 3.5 or more, or more preferably 4.0 or more. On the other hand, in the case where the CSM value is more than 12.0, since there is an excessive amount of second phase structure formed, there is a deterioration in stretch flange formability and coatability. Therefore, the CSM value is set to be 12.0 or less, preferably 10.8 or less, or more preferably 10.0 or less.

$$\text{CSM value}=33.8[\% \text{ C}][\% \text{ Mn}]+12.4[\% \text{ Si}]/[\% \text{ Mn}] \quad (1)$$

In equation (1), [% C], [% Mn], and [% Si] each denote the content (mass %) of the corresponding element.

Although it is possible to achieve the target properties according to aspects of the present invention with the indispensable constituents described above, the optional constituents described below may further be added as needed to further improve strength and press formability. Here, in the case where one of the optional constituents described below is contained in an amount less than the lower limit of the constituent, such a constituent is regarded as being contained as an inevitable impurity.

One or both of Nb: 0.005% to 0.060% and V: 0.005% to 0.080%

The chemical composition may further contain, by mass %, one or both of Nb: 0.005% to 0.060% and V: 0.005% to 0.080% in addition to the constituents described above. Nb is an element which improves the strength of a steel sheet through precipitation strengthening, and such an effect is realized in the case where the Nb content is 0.005% or more. The Nb content is preferably 0.010% or more. In the case where the Nb content is more than 0.060%, since there is an increase in the area fraction of a second phase, there is a deterioration in stretch flange formability. Therefore, in the case where Nb is added, the Nb content is set to be 0.060% or less or preferably 0.050% or less.

V is also an element which contributes to increasing the strength of a steel sheet through precipitation strengthening. Such an effect is realized in the case where the V content is 0.005% or more. The V content is preferably 0.010% or more. In the case where the V content is more than 0.080%, since there is an increase in the area fraction of a second phase, there is a deterioration in stretch flange formability. Therefore, in the case where V is added, the V content is set to be 0.080% or less or preferably 0.060% or less.

One or More of Cr: 0.02% to 0.15%, Mo: 0.02% to 0.5%, Cu: 0.05% to 0.5%, and Ni: 0.05% to 1.0%

In accordance with aspects of the present invention, the chemical composition may further contain, by mass %, one or more of Cr: 0.02% to 0.15%, Mo: 0.02% to 0.5%, Cu: 0.05% to 0.5%, and Ni: 0.05% to 1.0%. Cr, Mo, Cu, and Ni are added to improve the hardenability of steel and to thereby form a bainite structure. Such effects are realized in the case where the Cr content is 0.02% or more, the Mo content is 0.02% or more, the Cu content is 0.05% or more, or the Ni content is 0.05% or more. On the other hand, in the case where the Cr content is more than 0.15%, there is a significant deterioration in coatability. Therefore, in the case where Cr is added, the Cr content is set to be 0.02% to 0.15%. In the case where the Mo content is more than 0.5%, the Cu content is more than 0.5%, or the Ni content is more than 1.0%, since there is an excessive improvement in hardenability, there is an increase in the amount of a second phase structure, which results in a deterioration in stretch flange formability. Therefore, in the case where Mo is added, the Mo content is set to be 0.02% to 0.5%. In addition, in the case where Cu is added, the Cu content is set to be 0.05% to 0.5%. In addition, in the case where Ni is added, the Ni content is set to be 0.05% to 1.0%.

Sb: 0.0002% to 0.0200%

Sb is effective for inhibiting nitriding of the surface of a slab at the slab heating stage, thereby inhibiting the precipitation of BN in the surface layer of the slab. In addition, as a result of existing solid solution B, since it is also possible to achieve sufficient hardenability, which is necessary for forming bainite in the surface layer of a hot-rolled steel sheet, there is an improvement in the strength of the hot-rolled steel sheet. To realize such effects, it is necessary that the Sb content be 0.0002% or more, preferably 0.0005% or more, or more preferably 0.0010% or more. On the other hand, in the case where the Sb content is more than 0.0200%, since there is an increase in rolling load, there may be a deterioration in productivity. Therefore, in the case where Sb is added, the Sb content is set to be 0.0200% or less, preferably 0.0180% or less, or more preferably 0.0150% or less.

One or More of Ca: 0.0002% to 0.0100%, Mg: 0.0002% to 0.0100%, and REM: 0.0002% to 0.0100%

Ca is effective for controlling the shape of oxide- or sulfide-based inclusions and for thereby improving the stretch flange formability of a hot-rolled coated steel sheet. To realize such effects, the Ca content is set to be 0.0002% or more or preferably 0.0004% or more. However, in the case where the Ca content is more than 0.0100%, a surface defect may occur in the steel sheet. Therefore, in the case where Ca is added, the Ca content is set to be 0.0100% or less or preferably 0.0050% or less.

In addition, Mg, like Ca, is effective for controlling the shape of oxide- or sulfide-based inclusions and for thereby improving the stretch flange formability of a hot-rolled coated steel sheet. To realize such effects, the Mg content is set to be 0.0002% or more or preferably 0.0004% or more. However, in the case where the Mg content is more than 0.0100%, since there is a deterioration in the cleanliness of steel, there is conversely a deterioration in stretch flange formability. Therefore, in the case where Mg is added, the Mg content is set to be 0.0100% or less or preferably 0.0050% or less.

REM is, like Ca and Mg, is effective for controlling the shape of oxide- or sulfide-based inclusions and for thereby improving the low-temperature toughness of a hot-rolled coated steel sheet. To realize such effects, the REM content is set to be 0.0002% or more or preferably 0.0004% or more. However, in the case where the REM content is more than 0.0100%, since there is a deterioration in the cleanliness of steel, there is conversely a deterioration in low-temperature toughness. Therefore, in the case where REM is added, the REM content is set to be 0.0100% or less or preferably 0.0050% or less.

In accordance with aspects of the present invention, the balance which is different from the constituents described above is Fe and inevitable impurities. Examples of the inevitable impurities include Zr, Co, Sn, Zn, and W, and it is acceptable that the total content of these elements be 0.5% or less.

Hereafter, the reasons for the limitations on the steel microstructure of the steel sheet according to aspects of the present invention will be described.

The high-strength hot-rolled coated steel sheet according to aspects of the present invention has a steel microstructure containing a bainite structure as a main phase in a total amount of 85% or more in terms of area fraction and a martensite structure as a second phase in an amount of 2.0% or more and 15.0% or less in terms of area fraction. In addition, the term "steel microstructure" here denotes a steel microstructure in the central portion in the thickness direction of a sample. The sample is taken so that the position located at ¼ of the thickness of a high-strength hot-rolled coated steel sheet is the center in the thickness direction of the sample.

The high-strength hot-rolled coated steel sheet according to aspects of the present invention has a bainite structure as a main phase to achieve a high strength of 980 MPa or more and improved stretch flange formability. The area fraction of a bainite structure is set to be 85% or more, preferably 87% or more, or more preferably 90% or more. Here, the term "bainite structure" denotes a microstructure that is formed at an intermediate temperature range between a range for a polygonal ferrite structure, which is formed through diffusion transformation, and a range for a martensite structure, which is formed through diffusionless transformation, and that has an average dislocation density of $5 \times 10^{14}$ to $5 \times 10^{15}$ $m^{-2}$. In accordance with aspects of the present invention, a distinction is not made between a bainite structure, which is formed through cooling from an austenite phase, and a tempered bainite structure, which is formed by performing annealing on a bainite structure at temperatures equal to or lower than the Ac1 temperature. The average dislocation density is obtained from an EBSD pattern, which is taken by using an EBSD detector, produced by EDAX, AMETEK Inc., attached to a field-emission scanning electron microscope (FE-SEM SU5000), produced by Hitachi High-Tech Corporation, under the conditions of an accelerating voltage of 15 kV, a focal length of 19 mm, and a measurement interval of 0.25 μm. Specifically, the average dislocation density is obtained by using an average Kernel Average Misorientation (KAM value), which is obtained from the EBSD pattern by using data-analysis software (OIM Data Analysis Ver. 7.3). When the average KAM value is obtained, under the assumption that the group of measurement points having an Image Quality (IQ value) of 80000 or less is the group of a second phase, calculation is performed with the group of a second phase being excluded. The dislocation density $\rho$ ($m^{-2}$) is calculated by using equation (2) from the average KAM value $\theta$ (rad), a dislocation component constant $\alpha$ (=1.5), a Burgers vector b (=2.48× $10^{-10}$ m), and the measurement interval d (=2.5×$10^{-7}$ m).

$$\rho = 2\alpha\theta/bd \quad (2)$$

In accordance with aspects of the present invention, a microstructure containing a martensite structure as a second phase in an amount of 2.0% or more and 15.0% or less is formed to improve bulging formability. It is preferable that the area fraction of the second phase be 2.0% or more and 10.0% or less to improve a bulging formability-hole expansion formability balance. To achieve sufficient bulging formability, bulging formability is improved by forming a second phase structure whose strength and ductility are different from those of a main phase in a steel sheet and thereby decreasing a yield ratio. To realize such an effect, it is necessary that the area fraction of the second phase be 2.0% or more, preferably 3.0% or more, or more preferably 5.0% or more. On the other hand, in the case where the area fraction of the second phase is more than 15.0%, since minute voids, which are generated at the interface between the main phase, that is, a bainite structure, and the second phase structure, tends to combine with each other when a hole expansion test is performed, there is a deterioration in stretch flange formability. Therefore, the area fraction of the second phase is set to be 15.0% or less, preferably 13.0% or less, or more preferably 10.0% or less. Although it is possible to distinguish a martensite structure from a bainite structure by making a detailed observation of the sub-grain structure by using a SEM, it is also possible to identify a martensite structure on the basis of the fact that a martensite structure has a lower Image Quality (IQ value) in EBSD. Specifically, in the case where an EBSD pattern is taken by using FE-SEM SU5000 under the conditions of accelerating voltage of 15 kV and a focal length of 19 mm, the IQ value of a martensite structure is 80000 or less. The area fraction of a second phase is obtained by extracting the group of measurement points having an Image Quality (IQ value) of 80000 or less by utilizing a Highlighting function of OIM Analysis and by calculating the ratio of the total area of the group of measurement points having an IQ value of 80000 or less with respect to the measurement area. As described above, the term "second phase structure" in accordance with aspects of the present invention does not denote the name of some second phase structure but essentially denotes a structure having a low IQ value and a high dislocation density. That is, as long as the structure has an IQ value of 80000 or less, the second phase may be a tempered martensite structure or a lower bainite structure.

Here, in accordance with aspects of the present invention, examples of structures contained in a steel sheet include a retained austenite phase, a pearlite structure, and a ferrite structure in addition to the structures described above. Also in the case where a retained austenite phase, a pearlite structure, and a ferrite structure are contained, it is possible to sufficiently realize the effects according to aspects of the present invention as long as the total area fraction of the remainder of the microstructure is 0% to 3%.

The steel sheet according to aspects of the present invention includes a coating layer or an alloyed coating layer on the surface of the steel sheet to improve corrosion resistance so that the steel sheet is utilized as a hot-rolled steel sheet that can preferably be used as a material for automobile parts, which are exposed to a harsh corrosive environment. There is no particular limitation on the kind of the coating layer, and the coating layer may be an electroplating layer or a hot-dip coating layer. In addition, preferable examples of a hot-dip coating layer include a galvanizing layer. The coating layer may be an alloyed coating layer, which has been subjected to an alloying treatment.

Hereafter, the method for manufacturing the hot-rolled coated steel sheet according to aspects of the present invention will be described. Here, in the description, "° C." used when describing a temperature denotes the temperature of the surface of a steel sheet.

First, steel having the chemical composition described above is subjected to hot rolling including rough rolling and finish rolling followed by cooling and coiling to obtain a hot-rolled steel sheet. Subsequently, the hot-rolled steel sheet is subjected to annealing. Then, the annealed steel sheet is subjected to the deposition of a coating layer.

In accordance with aspects of the present invention, there is no particular limitation on the method used for preparing molten steel, known preparation method such as one using a converter or an electric furnace may be used. In addition, it is preferable that the molten steel be made into a slab (steel) by using a continuous casting method in consideration of problems such as segregation. However, a slab may be manufactured by using a known casting method such as an ingot casting-slabbing method or a thin-slab continuous casting method. Here, when the cast slab is subjected to hot rolling, the slab may be subjected to rolling after having been reheated by using a heating furnace or may be subjected to hot direct rolling without being reheated in the case where the slab has a temperature equal to or higher than a predetermined temperature.

The slab obtained as described above is subjected to heating, rough rolling, and finish rolling. In accordance with aspects of the present invention, it is necessary that carbides in the slab be dissolved before rough rolling is performed. In the case according to aspects of the present invention where Ti is added, it is preferable that the slab heating temperature be 1150° C. or higher. However, in the case where the heating temperature is excessively high, since the surface of the slab is excessively oxidized and $TiO_2$ is formed, that is, Ti is consumed, the strength of the surface of an obtained steel sheet tends to be decreased. Therefore, it is preferable that the heating temperature described above be 1350° C. or lower.

In addition, as described above, in the case where the slab before rough rolling is performed has a temperature equal to or higher than a predetermined temperature and carbides in the slab is sufficiently dissolved, it is possible to omit a process in which the steel before rough rolling is performed is heated. Here, there is no particular limitation on the conditions applied for rough rolling.

Subsequently, the rough-rolled slab is subjected to finish rolling followed by accelerated cooling and coiling so as to be made into a hot-rolled steel sheet.

It is preferable that finish rolling be performed in a temperature range of 840° C. or higher. In the case where a finishing delivery temperature is lower than 840° C., since ferrite transformation tends to progress during finish rolling, it is not possible to achieve the desired area fraction of a bainite structure. In addition, in the case where the finishing delivery temperature is higher than 950° C., since biting flaws occur, and since residual scale occurs after pickling has been performed, there may be a deterioration in coatability. Therefore, it is preferable that the finishing delivery temperature be 950° C. or lower.

After finish rolling has been performed, cooling is performed from a temperature at the end of finish rolling to a cooling stop temperature (coiling temperature) at an average cooling rate of 50° C./s or higher. In the case where the average cooling rate is lower than 50° C./s, since ferrite transformation progresses during cooling, it is not possible to achieve the desired area fraction of a bainite structure. Here, although there is no particular limitation on the upper limit of the average cooling rate, since it is difficult to control the cooling stop temperature in the case where the average cooling rate is excessively high, there may be a case where it is difficult to perform coiling at a desired coiling temperature. Therefore, it is preferable that the average cooling rate be 300° C./s or lower. In addition, it is preferable that cooling after finish rolling has been performed be started within 2.0 s after finish rolling has been performed.

It is preferable that the cooling stop temperature (coiling temperature) be 350° C. or higher and 600° C. or lower. In the case where the coiling temperature is lower than 350° C., the metallographic structure mainly contains a martensite structure, which has a significantly high dislocation density. In addition, in the case where the coiling temperature is lower than 350° C., since it is not possible to achieve the desired area fraction of the second phase, there is a deterioration in bulging formability. On the other hand, in the case where the coiling temperature is higher than 600° C., since a ferrite phase and a pearlite phase are formed, it is not possible to achieve a tensile strength of 980 MPa or more.

The hot-rolled steel sheet, which has been manufactured through the hot rolling process described above, may be subjected to skin pass rolling by using a common method and may be subjected to pickling to remove scale that has been generated on the surface of the steel sheet.

Subsequently, the hot-rolled steel sheet described above is subjected to an annealing treatment.

It is preferable that the annealing temperature be 800° C. or lower. In the case where the annealing temperature is higher than 800° C., since the second phase, which exists in the hot-rolled steel sheet, is decomposed or reversely transforms into austenite, it is not possible to achieve the desired area fraction of the second phase. It is preferable that the annealing temperature be as low as possible to achieve a tensile strength of 980 MPa or more, sufficient bulging formability, and sufficient stretch flange formability. However, in the case where a galvanizing treatment is performed after annealing has been performed, it is preferable that the annealing temperature be 650° C. or higher to activate the surface of the steel sheet. Here, it is preferable that a holding time when annealing is performed be 5 s or more and 300 s or lower.

The hot-rolled steel sheet, which has been subjected to annealing as described above, is subjected to a coating treatment. The coating treatment may be an electroplating treatment or a hot-dip coating treatment. For example, as a coating treatment, a galvanizing treatment may be performed or an alloying treatment may be performed after a galvanizing treatment has been performed. At this time, it is preferable that the galvanizing bath temperature or the alloying treatment temperature be not higher than the annealing temperature described above.

The hot-rolled coated steel sheet obtained as described above may be subjected to skin pass rolling by using a common method.

EXAMPLES

Molten steels having the chemical compositions given in Table 1 were prepared by using a converter and made into slabs having a thickness of 250 mm by using a continuous casting method. These slabs (steel) were heated under the conditions given in Table 2 and then subjected to rolling, cooling, and coiling under the conditions given in Table 2 so as to be made into hot-rolled steel sheets having a thickness of 2.0 mm to 2.6 mm and a width of 1000 mm. Subsequently, pickling followed by skin pass rolling with a skin pass rolling reduction of 0.8% was performed. Subsequently, annealing was performed under the conditions given in Table 2. Subsequently, the annealed steel sheets were dipped in a galvanizing bath having a temperature of 450° C. to form galvanizing layers on the surfaces of the steel sheets. Some of the galvanized steel sheets were further subjected to an alloying treatment for coating at a temperature of 500° C. for 100 s.

Microstructure observation, a tensile test, a hole expansion test, and a test for checking coatability were performed on test pieces which were taken from the obtained hot-rolled coated steel sheets. The testing methods were as follows.

(1) Microstructure Observation

After the cross section in the thickness direction parallel to the rolling direction of the obtained high-strength hot-rolled coated steel sheet had been subjected to polishing followed by etching in a 3 mass % initial solution to expose a steel microstructure, a SEM observation was performed at a position located at ¼ of the thickness. After SEM images of 10 fields of view at a magnification of 3000 times had been obtained, the area fraction of each of the phases (a bainite structure, a martensite or tempered martensite structure, a pearlite structure, and a ferrite structure) was obtained by performing image analysis. In addition, after the samples which had been used for the SEM observation had been subjected to mirror-finish polishing with a colloidal silica solution, an Electron Back Scatter Diffraction (EBSD) pattern was taken by using an EBSD detector (produced by EDAX, AMETEK Inc.) attached to a scanning electron microscope. The measurement utilizing the EBSD detector was performed on 2 fields of view having an area of 300 μm² or more which were randomly selected at a position located at ¼ of the thickness of the sample under the condition of irradiation with an electron beam at an interval (measurement interval) of 0.25 μm. After measurement points having an IQ value of 80000 or less had been extracted by performing analysis on the taken EBSD pattern by using analysis software OIM Analysis, produced by TSL solutions Co., Ltd., image analysis was performed to calculate the area fraction (%) of the second phase (martensite). In addition, by defining the structure which was identified as an austenite phase by performing analysis on the EBSD pattern as retained austenite, the area fraction (%) of retained austenite was calculated.

The average dislocation density of the main phase, that is, bainite, was obtained by using an average KAM value, which was obtained from the taken EBSD pattern.

(2) Tensile Test

A tensile test was performed in accordance with JIS Z 2241 on a JIS No. 5 tensile test piece which had been taken from the obtained high-strength hot-rolled coated steel sheet so that the tensile direction was perpendicular to the rolling direction to obtain yield stress (YS), tensile strength (TS), and total elongation (El). The test was performed two times and the average values of these properties were defined as the tensile properties of the above-described steel sheet. In addition, a yield ratio (YR) was calculated by using equation (3) from YS and TS.

$$YR = YS/TS \quad (3)$$

In accordance with aspects of the present invention, in a case where the YR obtained in the tensile test was 0.93 or less, bulging formability was judged as good.

(3) Hole Expansion Test

A test piece of 100 mm square was taken from the obtained hot-rolled coated steel sheet. After a hole had been punched in the central portion of the test piece by using a punch having a flat bottom with a diameter of 10 mmφ under the condition of a clearance of 12±1%, the hole was expanded by pushing a conical punch having a point angle of 60° upward from the side of the first punch. The conical punch was stopped at the moment when a clear crack penetrating the test piece in the thickness direction occurred, and the hole diameter was measured. A hole expansion ratio (λ) was calculated by dividing the difference between the hole diameter after expansion and the hole diameter before expansion by the hole diameter before expansion and by multiplying the divided result by 100, and the hole expansion ratio was used as the index of stretch flange formability. In accordance with aspects of the present invention, in a case where λ, which was obtained by performing the hole expansion test, was 50% or more, stretch flange formability was judged as good.

(4) Coatability

The coatability of the obtained high-strength hot-rolled coated steel sheet was evaluated by performing a visual judgment on the surface appearance. In Table 3, a case where a coating layer was formed across the whole length and whole width of a hot-rolled coated steel sheet was judged as "○", and a case where an uncoated portion was observed was judged as "x".

TABLE 1

| Steel | Chemical Composition (mass %) | | | | | | | | | |
|---|---|---|---|---|---|---|---|---|---|---|
| | C | Si | Mn | P | S | Al | N | Ti | B | Nb |
| A | 0.034 | 0.63 | 2.21 | 0.010 | 0.0008 | 0.048 | 0.0045 | 0.095 | 0.0039 | |
| B | 0.031 | 1.58 | 3.52 | 0.027 | 0.0015 | 0.065 | 0.0040 | 0.054 | 0.0018 | |
| C | 0.033 | 0.25 | 3.58 | 0.013 | 0.0028 | 0.015 | 0.0041 | 0.103 | 0.0023 | 0.033 |
| D | 0.038 | 1.20 | 2.33 | 0.029 | 0.0008 | 0.044 | 0.0041 | 0.145 | 0.0018 | |
| E | 0.042 | 0.16 | 2.49 | 0.015 | 0.0095 | 0.053 | 0.0038 | 0.185 | 0.0009 | |
| F | 0.041 | 1.33 | 3.10 | 0.012 | 0.0008 | 0.361 | 0.0039 | 0.076 | 0.0016 | |
| G | 0.053 | 1.00 | 2.24 | 0.019 | 0.0020 | 0.047 | 0.0041 | 0.125 | 0.0014 | |
| H | 0.049 | 1.12 | 3.50 | 0.005 | 0.0011 | 0.041 | 0.0041 | 0.044 | 0.0017 | |
| I | 0.050 | 0.20 | 2.29 | 0.011 | 0.0024 | 0.054 | 0.0035 | 0.166 | 0.0019 | |
| J | 0.051 | 0.18 | 3.05 | 0.014 | 0.0005 | 0.079 | 0.0054 | 0.122 | 0.0013 | |
| K | 0.064 | 0.13 | 2.34 | 0.019 | 0.0023 | 0.048 | 0.0027 | 0.170 | 0.0009 | |

TABLE 1-continued

| | | | | | | | | | |
|---|---|---|---|---|---|---|---|---|---|
| L | 0.060 | 0.63 | 2.77 | 0.012 | 0.0008 | 0.007 | 0.0021 | 0.108 | 0.0016 |
| M | 0.062 | 0.81 | 3.46 | 0.015 | 0.0012 | 0.056 | 0.0098 | 0.096 | 0.0011 |
| N | 0.071 | 0.03 | 2.90 | 0.008 | 0.0022 | 0.031 | 0.0041 | 0.135 | 0.0015 |
| O | 0.072 | 1.15 | 2.64 | 0.030 | 0.0009 | 0.047 | 0.0035 | 0.082 | 0.0007 |
| P | 0.079 | 0.02 | 2.20 | 0.014 | 0.0039 | 0.039 | 0.0032 | 0.151 | 0.0019 |
| Q | 0.082 | 0.85 | 2.90 | 0.019 | 0.0008 | 0.035 | 0.0049 | 0.069 | 0.0017 |
| R | 0.081 | 0.41 | 3.38 | 0.015 | 0.0028 | 0.210 | 0.0039 | 0.080 | 0.0036 |
| S | 0.090 | 0.73 | 2.20 | 0.019 | 0.0033 | 0.048 | 0.0027 | 0.118 | 0.0018 |
| T | 0.089 | 0.45 | 2.60 | 0.008 | 0.0020 | 0.044 | 0.0031 | 0.140 | 0.0055 |
| U | 0.088 | 0.31 | 3.46 | 0.015 | 0.0008 | 0.038 | 0.0041 | 0.090 | 0.0000 |
| V | 0.023 | 1.50 | 3.10 | 0.014 | 0.0039 | 0.079 | 0.0035 | 0.070 | 0.0018 |
| W | 0.105 | 0.05 | 2.60 | 0.009 | 0.0008 | 0.038 | 0.0041 | 0.121 | 0.0014 |
| a | 0.050 | 0.00 | 2.40 | 0.011 | 0.0016 | 0.018 | 0.0032 | 0.159 | 0.0014 |
| b | 0.032 | 1.65 | 2.22 | 0.012 | 0.0022 | 0.053 | 0.0021 | 0.095 | 0.0015 |
| c | 0.039 | 0.20 | 3.80 | 0.006 | 0.0009 | 0.039 | 0.0031 | 0.091 | 0.0036 |
| d | 0.044 | 1.40 | 2.15 | 0.018 | 0.0028 | 0.057 | 0.0048 | 0.105 | 0.0009 |
| e | 0.076 | 1.16 | 2.69 | 0.009 | 0.0006 | 0.045 | 0.0041 | 0.068 | 0.0019 |
| f | 0.032 | 0.04 | 2.74 | 0.015 | 0.0011 | 0.048 | 0.0031 | 0.120 | 0.0019 | 0.055 |

| | Chemical Composition (mass %) | | | | | | | | CSM |
|---|---|---|---|---|---|---|---|---|---|
| Steel | V | Cr | Mo | Cu | Ni | Sb | Ca | Mg | REM | Value |
| A | 0.075 | | | | | | | | | 6.1 |
| B | | | 0.20 | | | | | | | 9.3 |
| C | | | | | | | | | | 4.9 |
| D | | | | | | | | | | 9.4 |
| E | | | | | | | | | | 4.3 |
| F | | | | | | | | 0.0032 | 0.0018 | 9.6 |
| G | | | | | | | | | | 9.5 |
| H | | | | | | | | | | 9.8 |
| I | | | | | | | | | | 5.0 |
| J | | | | | | | | | | 6.0 |
| K | | | | | | | 0.0028 | | | 5.8 |
| L | 0.040 | | | | | | | | | 8.4 |
| M | | | | | | | | | | 10.2 |
| N | | 0.10 | | | | | | | | 7.1 |
| O | | | | | | | | | | 11.8 |
| P | | | | | | 0.012 | | | | 6.0 |
| Q | | | | | | | | | | 11.7 |
| R | | | 0.18 | 0.12 | | | | | | 10.8 |
| S | | | | | | | | | | 10.8 |
| T | | | | | | | | | | 10.0 |
| U | | | | | | | | | | 11.4 |
| V | | | | | | | | | | 8.4 |
| W | | | | | | | | | | 9.5 |
| a | | | | | | | | | | 4.1 |
| b | | | | | | | | | | 11.6 |
| c | | | | | | | | | | 5.7 |
| d | | | | | | | | | | 11.3 |
| e | | | | | | | | | | 12.3 |
| f | | 0.13 | 0.08 | | | | | | | 3.1 |

TABLE 2

| | | Manufacturing Condition | | | | | | | | |
|---|---|---|---|---|---|---|---|---|---|---|
| No | Steel | Slab Heating ° C. | Finishing Delivery Temperature ° C. | Thickness mm | Cooling Start Time s | Cooling Rate ° C./s | Coiling Temperature ° C. | Annealing Temperature ° C. | Annealing Time s | Alloying Treatment |
| 1 | A | 1250 | 875 | 2.0 | 1.5 | 80 | 600 | 700 | 50 | Done |
| 2 | B | 1300 | 895 | 2.3 | 0.5 | 65 | 540 | 750 | 100 | Done |
| 3 | C | 1260 | 935 | 2.6 | 0.5 | 60 | 500 | 720 | 160 | Done |
| 4 | D | 1300 | 910 | 2.6 | 1.0 | 60 | 480 | 680 | 60 | Done |
| 5 | E | 1300 | 880 | 2.3 | 1.0 | 70 | 450 | 700 | 90 | Done |
| 6 | F | 1260 | 940 | 2.0 | 1.0 | 80 | 420 | 660 | 150 | Not Done |
| 7 | G | 1160 | 920 | 2.3 | 0.5 | 60 | 400 | 650 | 80 | Not Done |
| 8 | H | 1160 | 940 | 2.6 | 1.0 | 100 | 380 | 700 | 100 | Done |
| 9 | I | 1300 | 930 | 2.6 | 1.0 | 60 | 360 | 640 | 120 | Done |
| 10 | J | 1280 | 920 | 2.3 | 0.5 | 80 | 580 | 720 | 160 | Not Done |
| 11 | K | 1280 | 920 | 2.0 | 1.5 | 70 | 560 | 750 | 120 | Not Done |
| 12 | L | 1220 | 910 | 2.0 | 0.5 | 75 | 510 | 760 | 15 | Not Done |
| 13 | M | 1200 | 890 | 2.3 | 1.5 | 65 | 540 | 740 | 110 | Done |

TABLE 2-continued

| | | Manufacturing Condition | | | | | | | | |
|---|---|---|---|---|---|---|---|---|---|---|
| No | Steel | Slab Heating °C. | Finishing Delivery Temperature °C. | Thickness mm | Cooling Start Time s | Cooling Rate °C./s | Coiling Temperature °C. | Annealing Temperature °C. | Annealing Time s | Alloying Treatment |
| 14 | N | 1250 | 880 | 2.3 | 1.5 | 120 | 490 | 710 | 100 | Done |
| 15 | O | 1220 | 865 | 2.3 | 0.5 | 100 | 420 | 700 | 80 | Done |
| 16 | P | 1280 | 877 | 2.6 | 0.5 | 80 | 440 | 680 | 90 | Not Done |
| 17 | Q | 1220 | 915 | 2.6 | 0.5 | 85 | 430 | 650 | 290 | Not Done |
| 18 | R | 1200 | 905 | 2.0 | 1.0 | 75 | 435 | 660 | 45 | Done |
| 19 | S | 1230 | 902 | 2.0 | 1.0 | 60 | 465 | 720 | 60 | Done |
| 20 | T | 1300 | 900 | 2.6 | 1.0 | 65 | 500 | 720 | 70 | Done |
| 21 | U | 1270 | 888 | 2.3 | 0.5 | 90 | 510 | 740 | 80 | Done |
| 22 | V | 1160 | 890 | 2.3 | 0.5 | 95 | 580 | 740 | 100 | Done |
| 23 | W | 1250 | 900 | 2.3 | 1.0 | 105 | 540 | 780 | 90 | Done |
| 24 | a | 1180 | 910 | 2.6 | 1.0 | 80 | 500 | 740 | 80 | Done |
| 25 | b | 1200 | 890 | 2.0 | 0.5 | 90 | 510 | 720 | 80 | Done |
| 26 | c | 1200 | 870 | 2.0 | 0.5 | 80 | 515 | 720 | 60 | Done |
| 27 | d | 1230 | 855 | 2.0 | 1.0 | 60 | 520 | 720 | 120 | Done |
| 28 | e | 1200 | 860 | 2.6 | 1.0 | 65 | 480 | 725 | 180 | Done |
| 29 | f | 1280 | 880 | 2.3 | 1.0 | 80 | 498 | 730 | 60 | Done |

TABLE 3

| | | Steel Sheet Microstructure | | | | | |
|---|---|---|---|---|---|---|---|
| No | Steel | Bainite Area Fraction % | Martensite Area Fraction % | Ferrite Area Fraction % | Pearlite Area Fraction % | Retained Austenite Area Fraction % | Average Dislocation Density of Main Phase $\times 10^{14}$ m$^{-2}$ |
| 1 | A | 93.5 | 4.5 | 2.0 | 0.0 | 0.0 | 8.4 |
| 2 | B | 91.5 | 7.0 | 0.0 | 0.0 | 1.5 | 9.3 |
| 3 | C | 95.5 | 3.0 | 0.0 | 0.0 | 1.5 | 9.4 |
| 4 | D | 91.5 | 7.5 | 1.0 | 0.0 | 0.0 | 9.8 |
| 5 | E | 95.5 | 3.5 | 1.0 | 0.0 | 0.0 | 8.7 |
| 6 | F | 90.0 | 9.5 | 0.0 | 0.0 | 0.5 | 8.8 |
| 7 | G | 91.0 | 9.0 | 0.0 | 0.0 | 0.0 | 10 |
| 8 | H | 90.5 | 9.5 | 0.0 | 0.0 | 0.0 | 8.6 |
| 9 | I | 95.0 | 5.0 | 0.0 | 0.0 | 0.0 | 8.5 |
| 10 | J | 94.0 | 5.5 | 0.0 | 0.0 | 0.5 | 9.1 |
| 11 | K | 94.5 | 5.5 | 0.0 | 0.0 | 0.0 | 8.7 |
| 12 | L | 92.0 | 8.0 | 0.0 | 0.0 | 0.0 | 11 |
| 13 | M | 90.0 | 9.5 | 0.0 | 0.0 | 0.5 | 9.1 |
| 14 | N | 93.5 | 6.5 | 0.0 | 0.0 | 0.0 | 9.7 |
| 15 | O | 86.0 | 14.0 | 0.0 | 0.0 | 0.0 | 8.4 |
| 16 | P | 95.0 | 5.0 | 0.0 | 0.0 | 0.0 | 8.7 |
| 17 | Q | 85.5 | 14.5 | 0.0 | 0.0 | 0.0 | 7.2 |
| 18 | R | 86.0 | 13.0 | 0.0 | 0.5 | 0.5 | 9.6 |
| 19 | S | 87.0 | 12.5 | 0.0 | 0.5 | 0.0 | 9.6 |
| 20 | T | 83.0 | 16.0 | 0.0 | 1.0 | 0.0 | 9.5 |
| 21 | U | 78.5 | 12.0 | 8.0 | 1.0 | 0.5 | 6.4 |
| 22 | V | 25.5 | 9.5 | 65.0 | 0.0 | 0.0 | 4.0 |
| 23 | W | 92.0 | 8.0 | 0.0 | 0.0 | 0.0 | 8.2 |
| 24 | a | 98.5 | 1.5 | 0.0 | 0.0 | 0.0 | 8.8 |
| 25 | b | 89.0 | 11.0 | 0.0 | 0.0 | 0.0 | 9.6 |
| 26 | c | 94.5 | 4.5 | 0.0 | 0.0 | 1.0 | 8.4 |
| 27 | d | 93.5 | 1.5 | 5.0 | 0.0 | 0.0 | 9.8 |
| 28 | e | 82.0 | 18.0 | 0.0 | 0.0 | 0.0 | 9.6 |
| 29 | f | 99.0 | 1.0 | 0.0 | 0.0 | 0.0 | 12 |

| | | Property | | | | | | |
|---|---|---|---|---|---|---|---|---|
| No | Steel | Coatability | YS MPa | TS MPa | YR | El % | λ % | Note |
| 1 | A | ○ | 903 | 989 | 0.91 | 15 | 87 | Example |
| 2 | B | ○ | 908 | 1017 | 0.89 | 16 | 53 | Example |
| 3 | C | ○ | 908 | 1025 | 0.89 | 16 | 73 | Example |
| 4 | D | ○ | 1004 | 1090 | 0.92 | 16 | 67 | Example |
| 5 | E | ○ | 1012 | 1061 | 0.95 | 17 | 35 | Comparative Example |
| 6 | F | ○ | 914 | 1014 | 0.90 | 16 | 56 | Example |
| 7 | G | ○ | 953 | 1029 | 0.93 | 17 | 65 | Example |
| 8 | H | ○ | 844 | 960 | 0.88 | 16 | 80 | Comparative Example |
| 9 | I | ○ | 922 | 1028 | 0.90 | 16 | 78 | Example |
| 10 | J | ○ | 906 | 982 | 0.92 | 17 | 71 | Example |

TABLE 3-continued

| | | | | | | | | |
|---|---|---|---|---|---|---|---|---|
| 11 | K | ○ | 930 | 1043 | 0.89 | 17 | 71 | Example |
| 12 | L | ○ | 890 | 1000 | 0.89 | 16 | 61 | Example |
| 13 | M | ○ | 915 | 1051 | 0.87 | 16 | 53 | Example |
| 14 | N | ○ | 940 | 1025 | 0.92 | 16 | 62 | Example |
| 15 | O | ○ | 883 | 1003 | 0.88 | 17 | 53 | Example |
| 16 | P | ○ | 940 | 1006 | 0.93 | 16 | 66 | Example |
| 17 | Q | ○ | 863 | 984 | 0.88 | 16 | 55 | Example |
| 18 | R | ○ | 914 | 1020 | 0.90 | 14 | 51 | Example |
| 19 | S | ○ | 937 | 1036 | 0.90 | 16 | 56 | Example |
| 20 | T | ○ | 1035 | 1126 | 0.92 | 13 | 40 | Comparative Example |
| 21 | U | ○ | 860 | 960 | 0.90 | 17 | 55 | Comparative Example |
| 22 | V | ○ | 722 | 889 | 0.81 | 16 | 38 | Comparative Example |
| 23 | W | ○ | 899 | 1010 | 0.89 | 16 | 45 | Comparative Example |
| 24 | a | ○ | 946 | 992 | 0.95 | 17 | 82 | Comparative Example |
| 25 | b | × | 922 | 1009 | 0.91 | 17 | 68 | Comparative Example |
| 26 | c | × | 899 | 984 | 0.91 | 15 | 66 | Comparative Example |
| 27 | d | ○ | 968 | 995 | 0.97 | 17 | 66 | Comparative Example |
| 28 | e | × | 848 | 1081 | 0.78 | 16 | 42 | Comparative Example |
| 29 | f | ○ | 969 | 991 | 0.98 | 16 | 91 | Comparative Example |

The invention claimed is:

1. A high-strength hot-rolled coated steel sheet comprising:
a steel sheet having
a chemical composition containing, by mass %,
C: 0.03% to 0.09,
Si: 0.01% to 1.60%,
Mn: 2.40% to 3.60%,
P: 0.100% or less,
S: 0.0100% or less,
Ti: 0.05% to 0.18%,
B: 0.0005% to 0.0050%,
Al: 0.005% to 0.40%,
Cr: 0.00%, or 0.02% to 0.09%
N: 0.010% or less, and a balance of Fe and inevitable impurities, in which a CSM value expressed by equation (1) below is 3.3 to 12.0, and
a steel microstructure containing bainite in an amount of 85% or more in terms of area fraction and martensite in an amount of 2.0% or more and 15.0% or less in terms of area fraction; and
a coating layer or an alloyed coating layer on a surface of the steel sheet;

CSM value=33.8[% C][% Mn]+12.4[% Si]/[% Mn]    (1), where, in equation (1), [% C], [% Mn], and [% Si] each denote the content (mass %) of the corresponding element,
wherein the coating layer or the alloyed coating layer is formed across a whole length and a whole width of the high-strength hot-rolled coated steel sheet, with no uncoated portion, as determined by visual inspection, and
wherein the steel sheet has a tensile strength of 980 MPa or more, a yield ratio of 0.93 or less, and a hole expansion ratio λ of 50% or more.

2. The high-strength hot-rolled coated steel sheet according to claim 1, wherein the chemical composition further contains, one or more selected from the following Groups A, B, C and D:
Group A: by mass %, one or both of
Nb: 0.005% to 0.060% and
V: 0.005% to 0.080%,
Group B: by mass %, one or more of
Mo: 0.02% to 0.5%,
Cu: 0.05% to 0.5%, and
Ni: 0.05% to 1.0%,
Group C: by mass %, Sb: 0.0002 ca to 0.0200%, and
Group D: by mass %, one or more of
Ca: 0.0002% to 0.0100%,
Mg: 0.0002% to 0.0100%, and
REM: 0.0002% to 0.0100%.

3. The high-strength hot-rolled coated steel sheet according to claim 1, wherein the chemical composition contains, by mass %, Cr: 0.02% to 0.09%.

4. The high-strength hot-rolled coated steel sheet according to claim 1, wherein the chemical composition contains, by mass %, Cr: 0.00%.

* * * * *

UNITED STATES PATENT AND TRADEMARK OFFICE
CERTIFICATE OF CORRECTION

PATENT NO. : 11,732,340 B2
APPLICATION NO. : 17/262975
DATED : August 22, 2023
INVENTOR(S) : Sota Goto It is certified that error appears in the above-identified patent and that said Letters Patent is hereby corrected as shown below:

On the Title Page

(57) ABSTRACT, the first paragraph, "Provided is a high-strength hot-rolled coated steel sheet having a TS of 980 MPa or more, excellent bulging formability and stretch flange formability, and excellent coatability." should be deleted.

Signed and Sealed this
Sixteenth Day of April, 2024

Katherine Kelly Vidal
*Director of the United States Patent and Trademark Office*